Oct. 27, 1931.   W. W. TURNBULL   1,829,201
ICE CREAM CONE
Filed Dec. 23, 1927

Inventor
Werd W. Turnbull

By Henry J. Savage
Attorney

Patented Oct. 27, 1931

1,829,201

UNITED STATES PATENT OFFICE

WERD W. TURNBULL, OF DAYTON, OHIO, ASSIGNOR TO McLAREN-CONSOLIDATED CONE CORPORATION, OF DAYTON, OHIO, A CORPORATION OF DELAWARE

ICE CREAM CONE

Application filed December 23, 1927. Serial No. 242,117.

Ice cream cones are very fragile pastry articles that are easily broken and require extreme care in handling and shipping, but with the best of care and packing many cones will be broken which entails a considerable loss on both the manufacturer and dealer. Several means have been devised heretofore for preventing breakage of ice cream cones and some of them are very efficient, as the ice cream cone and package of Patent 1,326,520.

Ice cream cones are usually packed for shipment in boxes containing either 100 or 250 cones, and these boxes are packed in corrugated cartons or shipping cases so that each case contains 1000 cones. The cones are nested together in sticks of 10 cones each, each cone projecting from one to one and one-quarter inches beyond the mouth of the cone into which it is nested, so that a stick of 10 cones is from 13½ to 16 inches long. This makes the boxes and cartons quite large, so that not only is their cost relatively great compared with the cost of the cones themselves, but also the freight rate is very high because of their large bulk and light weight.

Among the objects of my invention, therefore, is to produce an ice cream cone, which, while crisp and fragile, is strong enough at the points of greatest pressure and strain to withstand handling and shipping without breaking.

Another object is to produce an improved ice cream cone so that when two cones are nested one into the other, their walls will be held out of pressure or adhesive contact and the inner cone will extend or project only a short distance out of the outer cone, so that a "stick" of the nested cones will be much shorter than has heretofore been possible, and the size and cost of the boxes and cartons will be greatly reduced.

Another object is to provide an ice cream cone that is strong at the points where strength is needed and at the same time reduce the total amount of material in the cone and thereby increase the yield from a given quantity of material and correspondingly reduce the cost. With my improved cone, a stick of 20 full size cones is only 13½ to 14 inches high, or 20 of my cones can be packed in the same space that is occupied by 10 cones of the same size as heretofore made. This enables me to reduce by one half the cost of packing and boxing materials and also reduces handling, shipping and storage costs.

Figure 1:
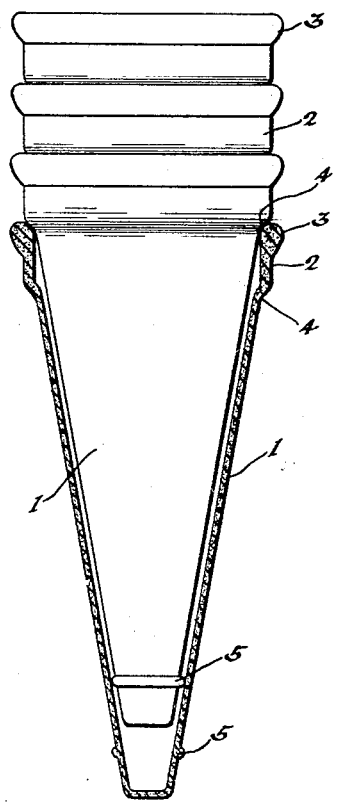
Figure 2:
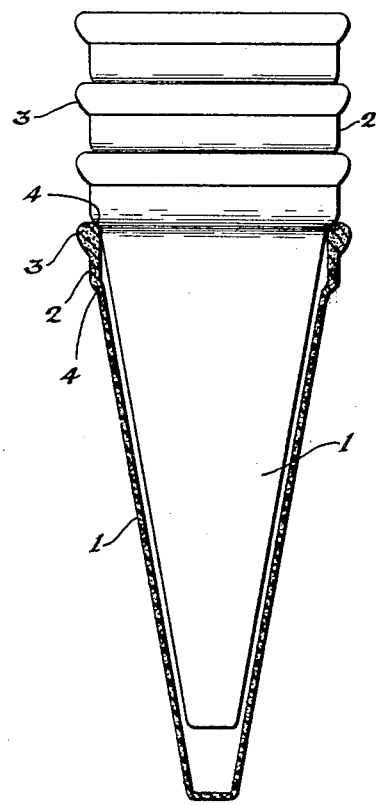

The above and other objects are attained by the embodiment of my invention which is illustrated on the accompanying drawings wherein, Fig. 1 is an elevation, with one cone in section, of a "stick" of my improved cones nested together, and Fig. 2 is a similar view of a slightly modified form.

My improved cone has a conical body portion 1 and a top portion 2 that is substantially cylindrical or of slight inside taper and is reinforced at the top by a bead or band 3.

The outside diameter at the top of the body is substantially equal to but slightly less than the inside diameter of the top portion so that an abrupt shoulder 4 is formed where the two join.

As shown in the drawings, the shoulder 4 on one cone rests on the mouth of the cone into which it is inserted so that the walls of the body portions 1 are kept out of contact. This prevents wedging and sticking of the cones together, which is the greatest cause of ice cream cones being broken.

Near the tip of the cones, a ring or bead 5 is provided which is of such a diameter as to loosely engage the inside wall of the cone into which it is inserted and keeps the cones forming the stick in alignment or co-axial.

Ice cream cones, as usually made, are about four and one-half inches long and from two to two and one-eighth inches in diameter at the top, and when two are nested together, the inner cone projects from one to one and one-quarter inches beyond the outer cone. This makes the stick of cones very long and requires a large carton for packing. On reference to the drawings, it will be seen that the top portion of my improved cone, which is the part that extends beyond the outer cone, is very short being only about ⅙ to ⅛ of the length of the cone. The over-all length of the stick is correspondingly reduced, and consequently the cost of the package.

The top 2 preferably is made of about twice the thickness of the body 1 and is further reinforced by the bead 3, so that the cone is strong where strength is required, and by making the body 1 thin, a large amount of material is saved, thereby further decreasing the cost of production.

The ice cream cone shown in Fig. 2 is the same in all respects as the cone of Fig. 1, except that the centering bead 5 is omitted. This bead is not essential to my invention but is of advantage because it keeps the points of all the cones in a stick co-axial.

The ice cream cones shown in the drawings are without exterior ornamentation, but it is understood that they may be provided with any desired pattern or ornamental design.

Having thus described my invention, what I claim and desire to secure by Letters Patent is:

1. An ice cream cone having a cylindrical top portion with relatively thick walls, a conical body portion having relatively thin walls, the large end of the body portion being of less diameter than the top portion, whereby a shoulder is formed at the union of the top and body portions and the mouth of one cone will engage the shoulder of another cone inserted into it, the top portion being from $1/8$ to $1/6$ of the length of the entire cone.

2. An ice cream cone having a substantially cylindrical top portion, a conical body, the maximum outside diameter of the body being less than the inside diameter of the top, an abrupt shoulder connecting the top and body, the height of the top portion being approximately one-eighth to one-sixth of the height of the cone, and the thickness and taper of the body being such that the shoulder of one cone will engage the mouth of another cone into which it is inserted and hold the side walls of the cones out of pressure contact.

3. An ice cream cone comprising a cylindrical top portion and a conical body portion, the top portion having an annular bead to reinforce the mouth of the cone, the conical body portion at its large end being of less external diameter than the cylindrical top, an abrupt or substantially horizontal shoulder joining the top and body portions to provide an abutment, the shoulder being spaced such a distance from the mouth of the cone that when one cone is nested within another the abutment of one cone will rest on the mouth of the other and hold the side walls out of pressure contact, the height of the top portion being not greater than one-sixth of the height of the entire cone.

WERD W. TURNBULL.